United States Patent [19]

Tobias

[11] Patent Number: 4,967,696
[45] Date of Patent: Nov. 6, 1990

[54] DOG COLLAR

[76] Inventor: Samuel Tobias, 7 Diamond Dr., Edison, N.J. 08820

[21] Appl. No.: 301,616

[22] Filed: Jan. 25, 1989

[51] Int. Cl.[5] .................... A01K 15/00; A01K 27/00
[52] U.S. Cl. ...................................... 119/29; 119/106
[58] Field of Search ................... 119/29, 106; 340/573

[56] References Cited

U.S. PATENT DOCUMENTS

| | | | |
|---|---|---|---|
| 3,336,530 | 8/1967 | Sloan et al. | 119/106 X |
| 3,589,337 | 6/1971 | Doss | 119/29 |
| 3,980,051 | 9/1976 | Fury | 119/29 |
| 4,598,272 | 7/1986 | Cox | 340/573 X |
| 4,659,314 | 4/1987 | Weinblatt | 340/573 X |
| 4,745,882 | 5/1988 | Yarnall, Sr. et al. | 119/29 |

FOREIGN PATENT DOCUMENTS

| | | | |
|---|---|---|---|
| 3237927 | 4/1984 | Fed. Rep. of Germany | 119/29 |
| 2523809 | 9/1983 | France | 119/29 |

OTHER PUBLICATIONS

"A Dog That's, 'Wired' To Pick Up Police Calls", Washington Times—Herald, Jun. 1, 1941, p. 4.

Primary Examiner—Robert P. Swiatek
Assistant Examiner—T. Manahan
Attorney, Agent, or Firm—Ralph W. Selitto, Jr.

[57] ABSTRACT

A dog collar has a receiver unit which is selectively and remotely actuated by a conventional transmitter. When actuated, the receiver unit emits a sound audible to the dog, thereby allowing an individual to communicate with his dot. The emitted sound can be either a simple tone or a human voice.

11 Claims, 2 Drawing Sheets

DOG COLLAR

FIELD OF THE INVENTION

The present invention relates to dog collars and, more particularly, to dog collars that can be selectively and remotely actuated to emit audible sounds for communicating with dogs.

BACKGROUND OF THE INVENTION

A dog owner who has access to an open field generally prefers to let his canine companion run free. This situation promotes the interests of both parties: the dog reaps the benefits of unrestrained exercise by roaming carefree across the field, and the owner or master relaxes and enjoys this time since he is not chained to his dog. Unfortunately, the dog has an innate tendency to roam too far. When the master calls the dog home, the dog is often too far to hear his master's calls.

Systems have been proposed for remotely communicating with animate objects, such as humans or other animals. For example, U.S. Pat. No. 4,598,272 discloses a dual communication system between parent and child, or between master and pet, in which both parties carry devices containing transmitters and receivers. The child's device also contains an audible alarm. If a parent wants to monitor his child, he transmits a signal to the child's device. The child's device responds by transmitting a return signal. Based upon the strength of the signal, the parent can determine the child's whereabouts. The parent can also actuate the audible alarm on the child's device by transmitting a signal. The alarm is intended to cause an abductor to release the child by frightening him or drawing attention to him.

A communications device that specifically relates to dog collars is disclosed in U.S. Pat. No. 3,336,530 which describes a directional finding system for hunting dogs. Here, a transmitter, affixed to the collar, continuously transmits a signal. The master, equipped with a receiver, determines his location relative to the dog based upon the strength of the input signal.

In U.S. Pat. No. 3,589,337, a system is disclosed which administers an electric shock to a dog. The electric impulse is generated by a transmitter/receiver tandem. Therefore, by remotely transmitting a signal, the master administers the shock directly to the dog. Because this device can only communicate with the dog via an electric impulse, its utility is limited to a deterrent device.

Another deterrent device for dogs is disclosed in U.S. Pat. No. 4,745,882. This device causes a mild shock or unpleasant noise to be administered to a dog as it approaches the walls of a pen or other confined area. The deterrent signal "persuades" the dog to stay within the restricted area.

Systems have also been proposed for identifying inanimate objects. For example, U.S. Pat. No. 4,659,314 discloses a remotely-actuated sounding device for locating magazines. The sounding device, which is attached to a magazine, can be actuated by a transmitter and receiver. More particularly, by transmitting a signal having a preselected frequency, the user actuates the sounding device, which emits an audible sound, thereby guiding him to his magazine.

SUMMARY OF THE INVENTION

The present invention relates to a new and improved device which allows an individual (i.e., a human) to communicate with a domestic animal, such as a dog. The device includes a receiver unit which can be attached to the dog by, for instance, a collar. Upon its selective and remote actuation by, for instance, a conventional transmitter, the receiver unit emits a sound audible to the dog. This sound can command the dog to return home or to perform some other act.

In one embodiment of the present invention, the receiver unit has a band-pass filter, a relay and a signal generator, which emits a simple tone. The frequency of the tone is within the audible range of the dog, but not necessarily within the audible range of a human. Therefore, a "silent" command can be sent to the dog. The band-pass filter is tuned to the frequency of the transmitted signal. A signal passed by the band-pass filter energizes the relay which actuates the signal generator. The signal generator emits the tone and the dog responds accordingly.

In another embodiment of the present invention, the transmitted signal carries a voice transmission of the individual and the dog collar emits the sound of the individual's voice. The receiver unit contains a band-pass filter that is tuned to the frequency of the transmitted signal. An audio amplifier amplifies the signal passed by the band-pass filter and drives a speaker. The dog responds to the individual's voice accordingly. By transmitting and emitting the individual's voice instead of a simple tone, the need for training is minimized since the dog is already familiar with his master's voice. Furthermore, the dog can receive more versatile commands.

BRIEF DESCRIPTION OF THE DRAWINGS

For a better understanding of the present invention, reference is made to the following description of two exemplary embodiments considered in conjunction with the accompanying drawings, in which.

DESCRIPTION OF THE EXEMPLARY EMBODIMENTS

Although the present invention can be adapted for communicating with many types of domestic animals (animals that can be trained to respond to commands), it is especially suitable for communicating with dogs. Accordingly, the present invention will be described in connection with a dog collar.

Figure 1:
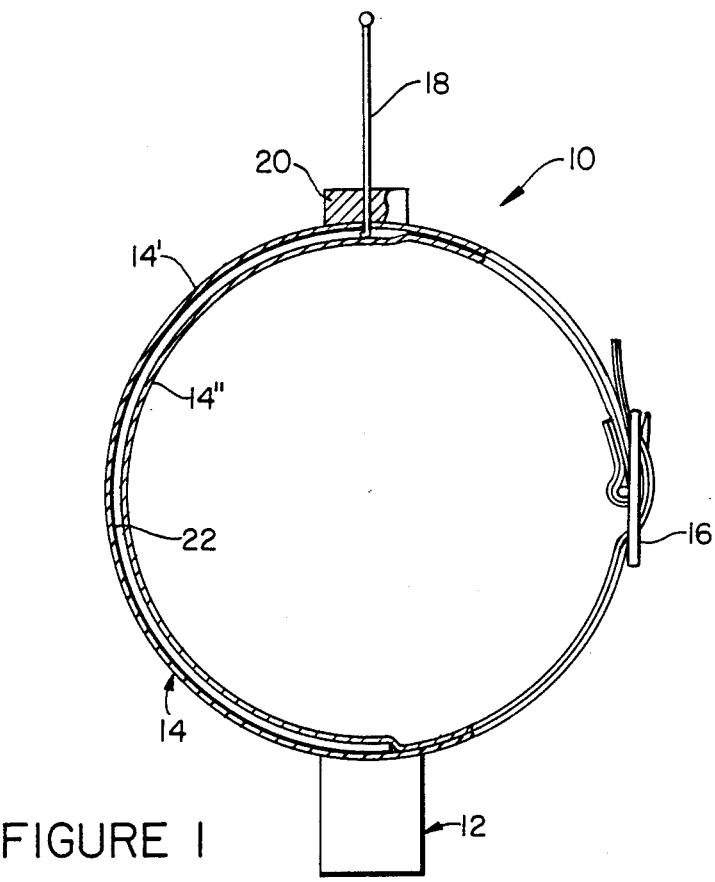
FIG. 1 is a cross-sectional view of a dog collar including a receiver unit constructed in accordance with one exemplary embodiment of the present invention.

Referring to FIG. 1, there is shown a dog collar 10 having a receiver unit 12 which emits an audible sound for communicating with a dog. The receiver unit 12 is selectively and remotely actuated by a transmitted signal. An individual (i.e., a human) transmits the signal using a transmitter such as a conventional amplitude modulated transmitter 32 that sends a voice transmission (see FIG. 2), or a conventional tone transmitter 132 that is controlled by a crystal or a variable frequency oscillator (see FIG. 3). The signal may be transmitted at any suitable frequency. Typically, the frequency is selected in the range of 27 megahertz so as to comply with FCC regulations concerning the licensing of airwaves.

The transmitter must have enough power to transmit signals up to a range of at least one mile. This range can be increased and will, of course, depend upon the application of the present invention. For example, in applications where the dog wanders no further than one mile from home, the necessary output power of the transmitter is in the order of milliwatts. Since the power requirement typically is low, the transmitter can be operated by a battery. A wide variety of transmitters are available and are well known to those skilled in the art.

A strap 14 mounts the receiver unit 12 to the dog. The strap 14 consists of two plies 14' and 14" of a suitable material, such as leather, covered with a water-resistant material, such as rubber or vinyl. A buckle 16 secures the strap 14 to the dog. While the present invention incorporates a collar to attach the receiver unit 12 to the dog, a harness or a coat could function as a suitable substitute.

An antenna 18 for increasing the reception range of the receiver unit 12 is attached to the strap 14 by an insulating block 20. In order to insulate the antenna 18 from the rest of the dog collar 10, the insulating block 20 is made from a suitable material, such as rubber. With the strap ends buckled together giving the strap 14 a circular shape as shown in FIG. 1, the antenna 18 is attached to the collar 10 at a point which is diametrically opposed to the receiver unit 12. The antenna 18, which is typically about six inches long, extends from the insulated block 20 in an upright position such that it does not interfere with the activity of the dog, and is at a sufficient elevation so as to insure reasonable range to receive the transmitted signal.

An insulated coaxial cable 22, which is positioned between the plies 14' and 14" of the strap 14, provides a conducting path between the antenna 18 and receiver unit 12. A metal foil (not shown), such as a thin piece of aluminum or copper, can be located between the plies 14' and 14". The foil serves as a ground plane for the antenna 18, it being understood that the coaxial cable 22 is insulated from the foil.

The dog collar 10 is light in weight so as not be burdensome upon the dog. However, the exact weight depends upon the size of the dog since a larger, stronger dog is capable of carrying a heavier collar.

Figure 2:
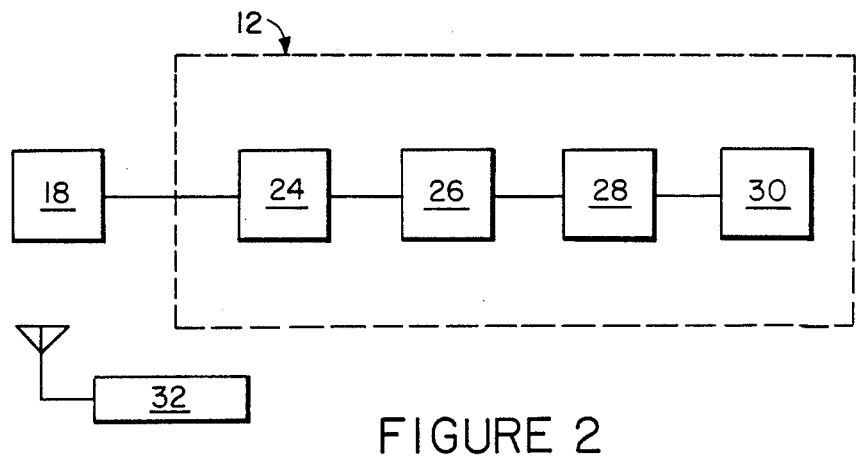
FIG. 2 is an electronic block diagram of the receiver unit illustrated in FIG. 1.

Referring now to FIG. 2, the receiver unit 12 includes a band-pass filter 24, an audio amplifier 26, a speaker 28, and a battery 30. The band-pass filter 24 and the audio amplifier 26 are typically combined in a conventional superheterdyne receiver. The band-pass filter 24 is connected to the antenna 18 by the coaxial cable 22 (see FIG. 1) and is tuned to the frequency of the transmitter 32. The audio amplifier 26 amplifies the attenuated, filtered transmitter signal in order to drive the speaker 28. The pass band is made narrow so as to prevent parasitic signals from being amplified and output over the speaker 28.

The size of the battery 30 depends upon the transmission range and the desired amplitude of the audio signal. Therefore, the size of the battery 30 is commensurate with the power required for amplifying the audio signal and driving the speaker 28.

When the individual desires to communicate with his dog, he simply speaks into the transmitter 32, which transmits a signal carrying his voice transmission. The signal is received by the antenna 18 and then conducted to the receiver unit 12 via the coaxial cable 22. The band-pass filter 24 passes an attenuated signal to the audio amplifier 26. The amplified signal drives the speaker 28 which emits a sound of the individual's voice. The dog responds to the individual's voice by, for instance, returning home.

Figure 3:
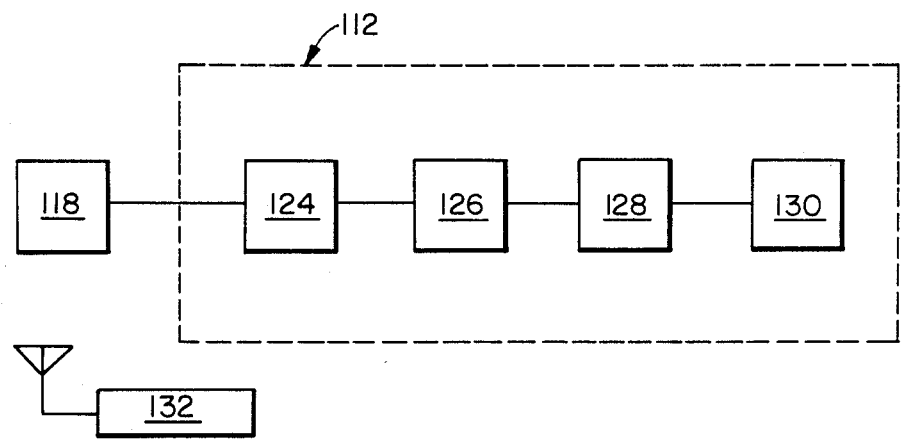
FIG. 3 is an electronic block diagram of a receiver unit employed by another exemplary embodiment of the present invention.

Before describing the embodiment of FIG. 3 in detail, it is noted that the elements illustrated in FIG. 3 which correspond to the elements described above with respect to the embodiment illustrated in FIG. 2 are designated with corresponding reference numerals increased by one hundred. The embodiment of FIG. 3 operates in the same manner as the embodiment of FIG. 2 unless it is otherwise stated.

Referring now to FIG. 3, a receiver unit 112 includes a band-pass filter 124, a relay 126, a monolithic signal generator 128, and a battery 130. The band-pass filter 124 is connected to an antenna 118 and is tuned to the frequency of a transmitter 132. The pass band is made narrow to prevent parasitic signals from actuating the receiver unit 112. The relay 126 has a coil (not shown) and a contact (not shown). The contact is connected in series with the signal generator 128 and the battery 130. The signal passed by the band-pass filter 124 energizes the coil which pulls in the contact, thereby completing the circuit between the signal generator 128 and the battery 130. The signal generator 128 is adapted to emit a tone. The frequency of the tone is within the audible range of the dog, but not necessarily within that of a human. If the tone is not within the audible range of a human, a "silent" command is issued. The signal generator 128 can be a conventional oscillator that is well known to those skilled in the art.

The size of the battery 130 depends upon the desired amplitude of the emitted audio signal. Therefore, the size of the battery 130 is commensurate with the power required for driving the signal generator 128.

In order to communicate with his dog, the individual transmits a signal by actuating the transmitter 132. The signal is received by the antenna 118 and then conducted to the receiver unit 112 via a coaxial cable like the one illustrated in FIG. 1 (see element 22 in such Figure). The band-pass filter 124 passes the attenuated signal, which energizes the coil on the relay 126. The energized coil pulls in the contact, thereby actuating the signal generator 128 and causing it to emit an audible tone. The dog responds to the tone by, for instance, returning home.

It will be understood that the embodiments described herein are merely exemplary and that a person skilled in the art may make many variations and modifications without departing from the spirit and scope of the invention. All such variations and modifications are intended to be included within the scope of the invention as defined in the appended claims.

I claim:

1. A device for allowing an individual to communicate with a domestic animal, said device being remotely actuated by a transmitted signal and comprising:

a collar, including attaching means for attaching said collar to the domestic animal;

receiving means attached to said collar for selectively receiving the transmitted signal;

emitting means, attached to said collar, for emitting a tone that is audible to the animal, said emitting means including a relay and an oscillator for generating said tone, said relay being responsive to the transmitted signal received by said receiving means to actuate said oscillator; and a source of operating potential attached to said collar for operating said emitting means.

2. A device according to claim 1, wherein said tone is not audible to a human.

3. A device according to claim 1, wherein said source of operating potential is a battery.

4. A device according to claim 1, wherein said receiving means includes a band-pass filter tuned to the frequency of the transmitted signal.

5. A device according to claim 4, wherein said receiving means further includes an antenna for increasing the receptivity of said band-pass filter.

6. A device according to claim 5, wherein said receiving means further includes insulating means for insulating said antenna from said collar.

7. A device according to claim 6 wherein said receiving means further includes a coaxial cable which electrically connects said antenna to said band-pass filter, said coaxial cable being embedded within said collar.

8. A device according to claim 7, wherein said receiving means further includes at least one strip of foil wrapped around said coaxial cable for providing a ground path for said antenna.

9. A device according to claim 8, wherein said at least one strip of foil is made of aluminum.

10. A device according to claim 8, wherein said at least one strip of foil is made of copper.

11. A device according to claim 1, wherein the animal is a dog.

* * * * *